(12) United States Patent
Park (10) Patent No.: US 11,586,279 B2
(45) Date of Patent: Feb. 21, 2023

(54) DISPLAY APPARATUS AND CONTROL METHOD THEREOF

(71) Applicant: SAMSUNG ELECTRONICS CO., LTD., Suwon-si (KR)

(72) Inventor: Gihoon Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/339,492

(22) Filed: Jun. 4, 2021

(65) Prior Publication Data

US 2021/0389819 A1 Dec. 16, 2021

(30) Foreign Application Priority Data

Jun. 11, 2020 (KR) .................. 10-2020-0070640

(51) Int. Cl.
*G06F 3/01* (2006.01)
*H04N 21/45* (2011.01)
*H04N 21/442* (2011.01)

(52) U.S. Cl.
CPC ....... *G06F 3/012* (2013.01); *H04N 21/44218* (2013.01); *H04N 21/4532* (2013.01)

(58) Field of Classification Search
CPC .............. G06F 3/012; H04N 21/44218; H04N 21/4532
USPC .............................. 345/156; 725/12; 434/365
See application file for complete search history.

(56) References Cited

U.S. PATENT DOCUMENTS

| | | | |
|---|---|---|---|
| 9,495,008 B2* | 11/2016 | Savastinuk | G06V 40/166 |
| 10,684,674 B2* | 6/2020 | Katz | H04N 5/33 |
| 2013/0260360 A1* | 10/2013 | Baurmann | G06F 3/14 |
| | | | 434/365 |
| 2014/0026156 A1* | 1/2014 | Deephanphongs | H04N 21/251 |
| | | | 725/12 |
| 2016/0337696 A1 | 11/2016 | Lee et al. | |
| 2016/0358225 A1* | 12/2016 | Zhang | G06F 16/5838 |
| 2017/0034505 A1* | 2/2017 | Fusama | H04N 13/128 |
| 2019/0333472 A1 | 10/2019 | Kim | |
| 2019/0335115 A1* | 10/2019 | Kumai | H04N 5/23238 |
| 2020/0050835 A1 | 2/2020 | Xu et al. | |

FOREIGN PATENT DOCUMENTS

| | | |
|---|---|---|
| KR | 10-2015-0036713 A | 4/2015 |
| KR | 10-2015-0093425 A | 8/2015 |
| KR | 10-1559313 B1 | 10/2015 |
| KR | 10-2016-0144305 A | 12/2016 |
| KR | 10-2019-0129947 A | 11/2019 |

OTHER PUBLICATIONS

International Search Report and Written Opinion (PCT/ISA/210 and PCT/ISA/237) dated Sep. 30, 2021 issued by the International Searching Authority in International Application No. PCT/KR2021/007171.

* cited by examiner

*Primary Examiner* — Prabodh M Dharia
(74) *Attorney, Agent, or Firm* — Sughrue Mion, PLLC (57) ABSTRACT

A display apparatus including a display, and a processor configured to identify a user from an image of an external environment of the display apparatus captured by a camera, identify, from the image, a separation distance of the user and a radian of a face of the user, wherein the separation distance of the user is a distance between a position of the user and a preset point, and display content corresponding to the user on the display based on the separation distance and the radian.

20 Claims, 9 Drawing Sheets

| USER ID | USER PROFILE | SEPARATION DISTANCE (m) | RADIAN | |
|---|---|---|---|---|
| | | | PITCH | YAW |
| ID(A) | 10, F | 30 | 40 | 60 |
| ID(B) | 20, M | 10 | 10 | 20 |
| ID(C) | 20, F | 20 | 10 | 10 |

FIG. 9

DISPLAY APPARATUS AND CONTROL METHOD THEREOF

CROSS-REFERENCE TO RELATED APPLICATION

This application is based on and claims priority under 35 U. S. C. § 119 to Korean Patent Application No. 10-2020-0070640, filed on Jun. 11, 2020 the disclosure of which is herein incorporated by reference in its entirety.

BACKGROUND

1. Field

The disclosure relates to a display apparatus that identifies a viewing user and displays a video of content preset to suit the user's propensity, and a control method thereof, and more particularly, to a display apparatus for selecting a user interested in the display apparatus among identified users when the display apparatus is installed in an environment that may be used by a number of unspecified users, and a control method thereof.

2. Discussion of Related Art

In order to compute and process predetermined information according to a specific process, an electronic apparatus including electronic components such as a processor, a chipset, and a memory for computation may be classified into various types depending on what information is to be processed or what its purpose is. For example, the electronic apparatus includes an information processing apparatus such as a personal computer (PC) or a server that processes general-purpose information, an image processing apparatus that processes image data, an audio apparatus that processes audio, a household appliance that performs household chores, and the like. The image processing apparatus may be implemented as a display apparatus that displays processed image data as a video on a display panel provided therein.

The display apparatus goes beyond simply displaying a video, and may be designed in differently according to an installation environment in which there is a user to view a video. For example, a portable multimedia player targets a single user, a TV targets a single user or a small number of users, and a digital signage targets a number of unspecified users. When the display apparatus provides content tailored to a user, for example, the digital signage selects and provides content that reflects the interest or propensity of users expected to be in the installation environment. The digital signage is one method of selecting content, and acquires information based on analysis of the interest or propensity of the population of users who use (or move) the installed environment, and selects content based on the acquired information, and displays the selected content as a video according to a scheduling method.

However, in the related art, since content is selected only according to a predefined setting method, there is a problem in that users having a different propensity or interest from the previously analyzed population are not considered. In particular, due to the nature of the installation environment in which a number of unspecified users move, the digital signage is not easy to set representative interests or propensities in advance. In addition, when there is a user moving in the installation environment of the digital signage, the related art method also does not take into account whether or not the user is interested in the digital signage (i.e., whether the user pays attention to the content image displayed on the digital signage). When a given user is paying attention to the digital signage, the user is likely to view the image displayed by the digital signage. However, when the user is not paying attention to the digital signage, it is highly likely that the user will indifferently overlook what is being displayed even if the digital signage displays a video.

From this point of view, when the display apparatus is installed in the environment used by a plurality of users, such as the digital signage, identifying a user paying attention to the display apparatus has a major relationship with the selection of content to be provided.

SUMMARY

According to an aspect of the disclosure, there is provided a display apparatus including: a display; and a processor configured to identify a user from an image of an external environment of the display apparatus captured by a camera, identify, from the image, a separation distance of the user and a radian of a face of the user, wherein the separation distance of the user is a distance between a position of the user and a preset point, and display content corresponding to the user on the display based on the separation distance and the radian.

The processor may be further configured to identify a degree of viewing interest of the user based on the separation distance and the radian, and display the content on the display based on the degree of viewing interest.

The processor may be further configured to select, based on the degree of viewing interest, the user from among a plurality of users identified in the image, and select the content based on a profile of the selected user.

The processor may be further configured to compare degrees of viewing interest of the plurality of users and select at least one user with a predetermined ranking or higher from among the plurality of users.

The processor may be further configured to select the user based on the user having a degree of viewing interest that is greater than or equal to a threshold value.

The processor may be further configured to obtain the profile of the user by using a demographic model.

The processor may be further configured to apply weights corresponding to a device characteristic of the display apparatus to the separation distance and the radian, and determine the degree of viewing interest based on the separation distance and the radian to which the weights have been applied.

The processor may be further configured to: identify the radian based on a pitch value and a yaw value of the face of the user, identify an aspect ratio of the display, and apply weights to the pitch value and the yaw value based on the aspect ratio of the display, wherein the weight applied to the yaw value is increased based on identifying that a horizontal length of the display is greater than a vertical length of the display, and the weight applied to the pitch value is increased based on identifying that the vertical length of the display is greater than the horizontal length of the display.

The processor may be further configured to identify the radian based on a pitch value of the face of the user and a yaw value of the face of the user.

The processor may be further configured to select content corresponding to a profile of the user, and display the selected content on the display.

The processor may be further configured to select a layout of content corresponding to a profile of the user, and display the content according to the selected layout on the display.

According to an aspect of the disclosure, there is provided a method of controlling a display apparatus, the method including: identifying a user from an image an image of an external environment of the display apparatus captured by a camera; identifying, from the image, a separation distance of the user and a radian of a face of the user, wherein the separation distance of the user is a distance between a position of the user and a preset point; and displaying content corresponding to the user on the display based on the separation distance and the radian.

The method may further include identifying a degree of viewing interest of the user is identified based on the separation distance and the radian, wherein the displaying the content includes displaying the content based on the degree of viewing interest.

The method may further include selecting, based on the degree of viewing interest, the user from among a plurality of users identified in the image; and selecting the content based on a profile of the selected user.

The selecting the user may include comparing degrees of viewing interest of the plurality of users; and selecting at least one user with a predetermined ranking or higher from among the plurality of users.

The selecting the user may include selecting the user based on the user having a degree of viewing interest that is greater than or equal to a threshold value.

The method may further include obtaining the profile of the user using a demographic model.

The identifying the degree of viewing interest may include applying weights corresponding to a device characteristic of the display apparatus to the separation distance and the radian, and determining the degree of viewing interest based on the separation distance and the radian to which the weights have been applied.

The radian may be identified based on a pitch value and a yaw value of the face of the user, and the applying the weight to the radian may include: identifying an aspect ratio of the display; and applying weights to the pitch value and the yaw value based on the aspect ratio of the display, wherein the weight applied to the yaw value is increased based on identifying that a horizontal length of the display is greater than a vertical length of the display, and the weight applied to the pitch value is increased based on identifying that the vertical length of the display is greater than the horizontal length of the display.

The identifying the radian may include identifying the radian based on a pitch value of the face of the user and a yaw value of the face of the user.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Hereinafter, embodiments according to the disclosure will be described in detail with reference to the accompanying drawings. Embodiments described with reference to each drawing are not mutually exclusive configurations unless otherwise specified, and a plurality of embodiments may be selectively combined and implemented in one apparatus. The combination of the plurality of embodiments may be arbitrarily selected and applied by a person skilled in the art of the disclosure in implementing the spirit of the disclosure.

If there are terms including an ordinal number such as a first component, a second component, and the like in embodiments, these terms are used to describe various components, and the terms are used to distinguish one component from other components, and therefore meaning of these components are not limited by these terms. Terms used in the embodiments are applied to describe the embodiments, and do not limit the spirit of the disclosure.

In addition, in the case where the expression "at least one" of a plurality of elements in the present specification appears, the expression refers to not only all of the plurality of components, but also each one of the plurality of components excluding the rest components or all combinations thereof.

Figure 1:
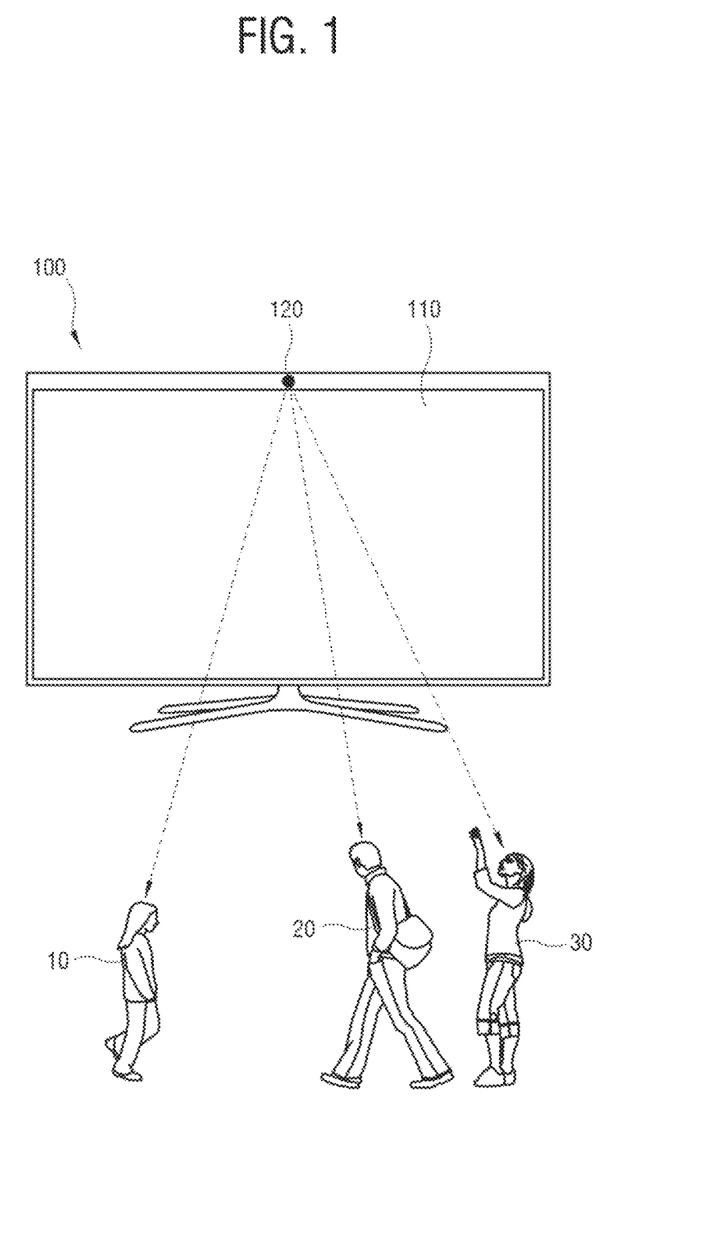
FIG. 1 is an example diagram of a display apparatus.

FIG. 1 is an example diagram of a display apparatus.

As illustrated in FIG. 1, a display apparatus 100 according to an embodiment displays a video of content related to predetermined content. The display apparatus 100 may be implemented as various types of display apparatuses installed and used in various environments, and an implementation method thereof is not limited. In the present embodiment, the display apparatus 100 is a digital signage installed outdoors where a number of unspecified users can move, but the display apparatus 100 may include other various types of display apparatuses such as a TV that may be viewed by several family members in a living room and an electronic blackboard and an electronic frame that users may see in a classroom.

The display apparatus 100 includes a display 110 for displaying a video. The display apparatus 100 displays video content on the display 110 by selecting pre-stored content data or content data received from an external source and processing the selected content data according to an image processing process.

In addition, the display apparatus 100 includes a camera 120 for photographing or capturing an external environment. In the present embodiment, although the display apparatus 100 includes the camera 120, embodiments the disclosure are not limited thereto. For example, is the case where the display apparatus 100 does not include the camera 120, the display apparatus 100 may receive a captured video of an external environment from a separate communicable external apparatus. The camera 120 generates a captured video of an external environment continuously photographed for a designated time. This captured video includes a captured video corresponding to each time point measured by the display apparatus 100. However, the time and method in which the camera 120 generates the captured video or the captured image is not limited, and the captured video or the captured image may be generated by the camera 120 according to various criteria.

The display apparatus 100 may store or receive various types of content and may display a video of each content on the display 110 according to a predefined schedule. Alternatively, the display apparatus 100 according to the present embodiment may identify one or more users in an external environment, select content suitable for (corresponding to or optimized for) the identified user, and display a video of the on the display 110. Here, the display apparatus 100 may identify a user from the captured video of the external environment captured by the camera 120.

When a plurality of users are identified in the captured image, the display apparatus 100 may select content in consideration of all the identified users. Alternatively, in order to provide more optimized content, the display apparatus 100 may secondly identify some users according to a preset selection criterion among a plurality of users primarily identified in the captured image, and identify content in consideration of the secondly identified users. The display apparatus 100 re-selects users, and the criteria for selection will be described below.

Hereinafter, a configuration of the display apparatus 100 will be described.

Figure 2:
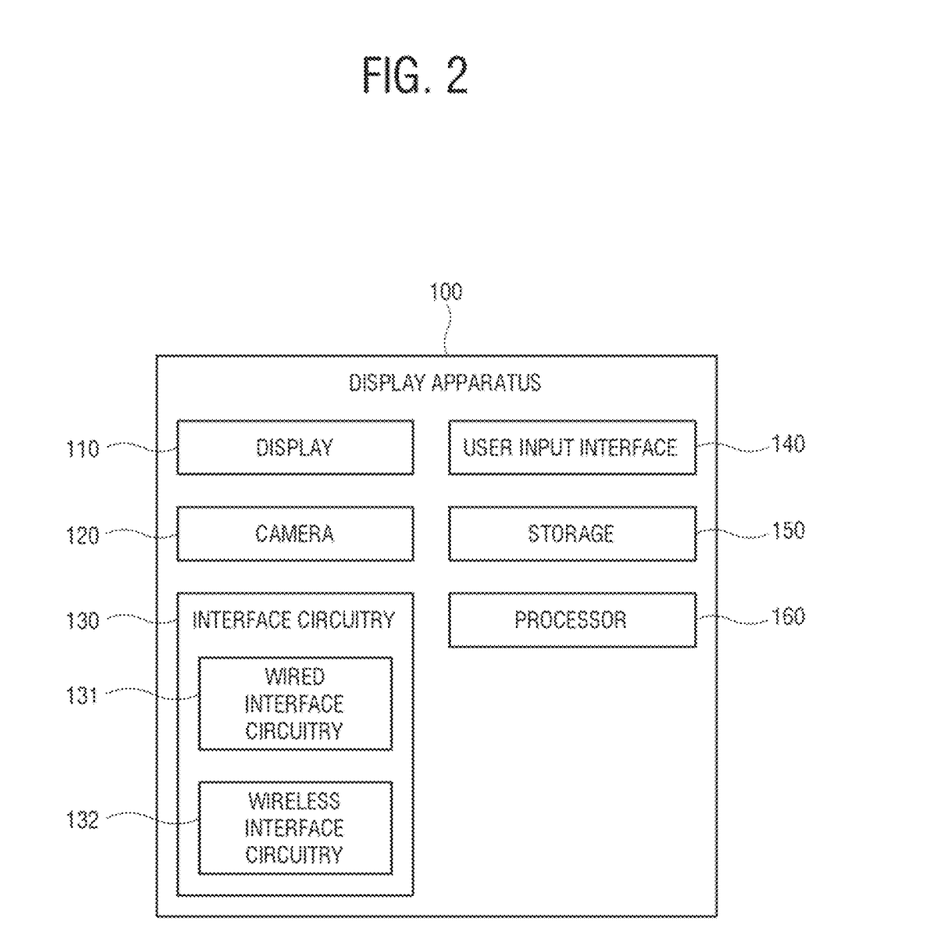
FIG. 2 is a block configuration diagram of the display apparatus.

FIG. 2 is a block configuration diagram of the display apparatus.

As illustrated in FIG. 2, the display apparatus 100 may include the display 110. The display 110 includes a display panel that may display a video on a screen. The display panel is provided as a light-receiving structure such as a liquid crystal type or a self-luminous structure such as an organic light-emitting diode (OLED) type. The display 110 may further include additional components according to the structure of the display panel. For example, if the display panel is a liquid crystal type, the display 110 includes a liquid crystal display panel, a backlight unit that supplies light, and a panel driving substrate that drives a liquid crystal of the liquid crystal display panel.

The display apparatus 100 may include the camera 120. The camera 120 may have various structures including a charge-coupled device (CCD) image sensor. The camera 120 according to the present embodiment has a monocular structure, but embodiments are not limited thereto. For example, the display apparatus 100 may include a camera having may have a binocular structure or a plurality of cameras having a monocular structure.

The display apparatus 100 may include interface circuitry 130. The interface circuitry 130 for the display apparatus 100 to communicate with the external apparatus and transmit/receive data. The interface circuitry 130 may include one or more wired interface circuitry 131 for wired communication connection and/or one or more wireless interface circuitry 212 for wireless communication connection, according to a connection method. In the present embodiment, the interface circuitry 130 includes both the wired interface circuitry 131 and wireless interface circuitry 212, but may include only one of the wired interface circuitry 131 or the wireless interface circuitry 212, according to the design method.

The wired interface circuitry 131 includes a connector or a port to which a cable of a predefined transmission standard is connected. For example, the wired interface circuitry 131 is connected to a terrestrial or satellite broadcasting antenna to receive a broadcast signal, or includes a port through which a cable of cable broadcasting is connected. Alternatively, the wired interface circuitry 131 includes a port to which cables of various wired transmission standards such as HDMI, DP, DVI, a component, composite, S-Video, and Thunderbolt are connected to connect to various image processing apparatuses. Alternatively, the wired interface circuitry 131 includes a USB standard port for connecting to a USB device. Alternatively, the wired interface circuitry 131 includes an optical port to which an optical cable is connected. Alternatively, the wired interface circuitry 131 includes an audio input port to which an external microphone is connected and an audio output port to which a headset, an earphone, an external speaker, and the like are connected. Alternatively, the wired interface circuitry 131 includes an Ethernet port connected to a gateway, a router, a hub, or the like to access a wide area network.

The wireless interface circuitry 132 includes a two-way communication circuit including at least one or more of components such as a communication module and a communication chip corresponding to various types of wireless communication protocols. For example, the wireless interface circuitry 132 is a Wi-Fi communication chip that performs wireless communication with an access point (AP) according to a Wi-Fi method, communication chips performing wireless communication such as Bluetooth, Zigbee, Z-Wave, WirelessHD, WiGig, and NFC, an IR module for IR communication, a mobile communication chip performing mobile communication with a mobile device, and the like.

The display apparatus 100 may include a user input interface 140. The user input interface 140 includes various types of user input interface related circuits that are provided to be manipulated by a user in order to perform user input. In terms of an input/output interface, the user input interface 140 may be classified as a component included in the interface circuitry 130. The user input interface 140 may be configured in various forms according to the type of the display apparatus 100, and the user input interface 100 includes, for example, a mechanical or electronic button unit of the display apparatus 100, a touch pad, a sensor, a camera, a touch screen, a remote control separated from the display apparatus 100, and the like.

The display apparatus 100 may include a storage 150. The storage 150 stores digitized data. The storage 150 includes a nonvolatile storage that may preserve data regardless of whether the nonvolatile storage is supplied with power, and a volatile memory that may be loaded with data processed by a processor 160 and may not preserve data when the volatile memory is not supplied with power. The storage may include a flash-memory, a hard-disc drive (HDD), a solid-state drive (SSD), a read-only memory (ROM), and the like, and the memory includes a buffer, a random access memory (RAM), and the like.

The display apparatus 100 may include a processor 160. The processor 160 includes one or more hardware processors implemented by hardware elements as a central processing unit (CPU), a chipset, a buffer, a circuit, and the like that are mounted on a printed circuit board, and may be implemented as a system on chip (SOC) depending on the design method. The first processor 216 includes modules corresponding to various processes such as a demultiplexer, a decoder, a scaler, an audio digital signal processor (DSP), and an amplifier for image processing. Here, some or all of these modules may be implemented as an SOC. For example, a module related to image processing such as a demultiplexer, a decoder, and a scaler may be implemented as an image processing SOC, and an audio DSP may be implemented as a separate chipset from the SOC.

The processor 160 analyzes the user from the captured image transmitted from the camera 120 and selects content corresponding to an analysis result from a plurality types of content that can be acquired. The processor 160 processes the selected content and displays the processed content as a video on the display 110. The operation of the processor 160 related thereto will be described below.

Figure 3:
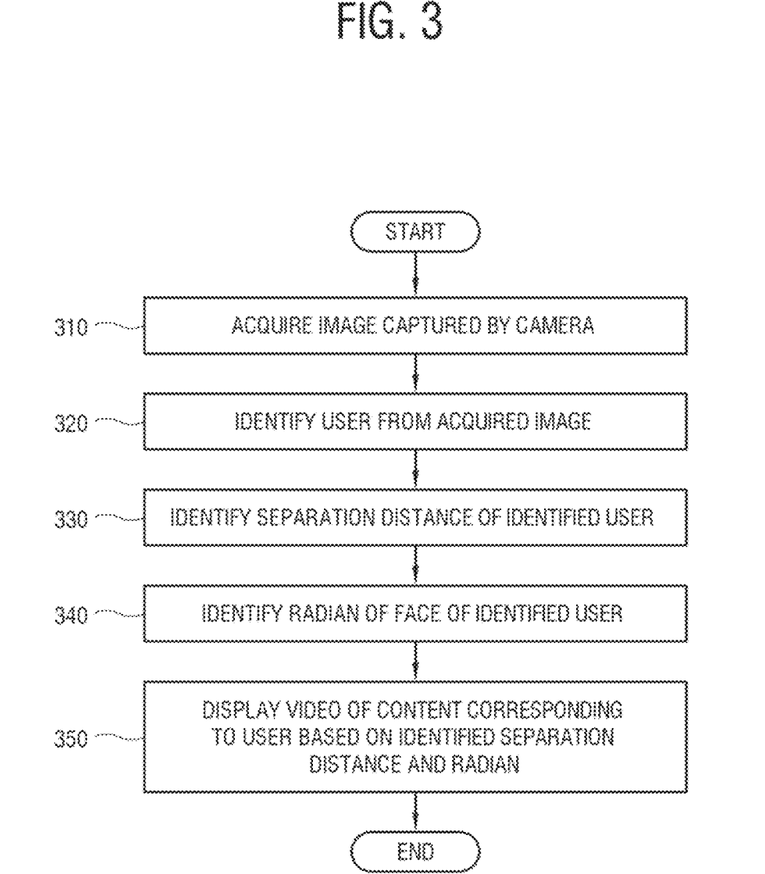
FIG. 3 is a flowchart illustrating a control method of a display apparatus.

FIG. 3 is a flowchart illustrating a control method of a display apparatus.

As illustrated in FIG. 3, the following operations are performed by the processor 160 (see FIG. 2) of the display apparatus 100 (see FIG. 1).

In operation 310, the display apparatus acquires an image/video captured by a camera. The camera may be included in the display apparatus or may be a separate external apparatus which provides the image to the display apparatus.

In operation 320, the display apparatus identifies a user from the acquired image. The display apparatus may analyze a user's face through, for example, analysis of an shape of an object in an image, and identify characteristics of the user such as gender and age from the analyzed user's face.

In operation 330, the display apparatus identifies a separation distance of the identified user. The separation distance of the user refers to a distance between positions of the user from a certain point (for example, the camera of the display apparatus).

In operation 340, the display apparatus identifies a radian of the identified user's face. The radian of the face represents a front angle of a face with respect to a reference point based on a preset point (for example, the camera of the display apparatus). Here, the preset point for the identification of the separation distance of the user and the preset point for the identification of the radian of the user's face may be the same or different points.

In operation 350, the display apparatus displays the video of content corresponding to the user based on the identified separation distance and the identified radian. As a result, the display apparatus may provide content suitable to a user who is interested in the display apparatus. The content corresponding to the user may be, for example, content such as an advertisement reflecting a selected user's preference, and it is possible to change a layout, such as the arrangement of content in a video to suit the selected user.

When there is only one user identified from the image, the display apparatus may or may not select the corresponding user according to the predetermined criteria. Alternatively, when there are a plurality of users identified from the image, the display apparatus may select one or more users according to the predetermined criteria. The predetermined criteria may also be provided in various ways, which will be described later.

As an example of a method of selecting a user, the display apparatus may select a user based on a degree of viewing interest indicating how much the identified user is interested in the display apparatus. When it is determined that the degree of viewing interest of the user is relatively high or is higher than a predetermined threshold value, the display apparatus may select the corresponding user and when it is determined that the degree of viewing interest of the user is relatively low or is lower than the threshold value, the display apparatus may not select the corresponding user. In the following embodiments, this process will be described in detail.

In addition, in the present embodiment, the case in which the display apparatus selects content corresponding to the user has been described, but various methods of selecting content corresponding to a degree of viewing interest are possible according to a design method. For example, content corresponding to a digitized degree of viewing interest may be previously designated. The display apparatus may acquire the degree of viewing interest of the identified user, and select and provide content designated to correspond to the acquired degree of viewing interest.

Hereinafter, a method of acquiring, by a display apparatus, a user's profile from an image captured by a camera will be described.

Figure 4:
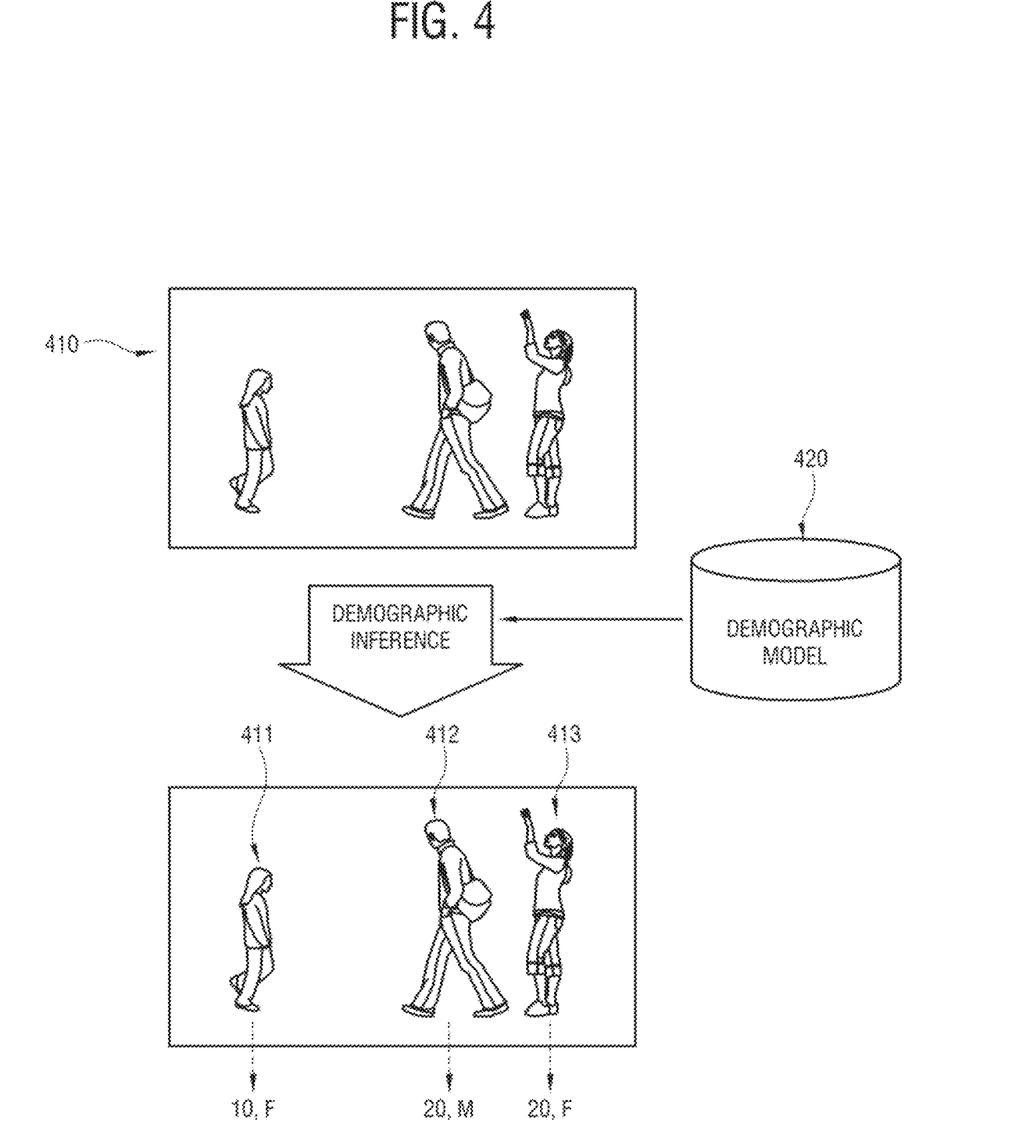
FIG. 4 is an example diagram illustrating a method of obtaining a user's profile by using a demo graphic model from a captured video by a display apparatus.

FIG. 4 is an example diagram illustrating a method of acquiring, by a display apparatus, a user's profile by using a demographic model from a captured image.

As illustrated in FIG. 4, the display apparatus (for example, the display apparatus 100 of FIG. 2) acquires a captured image 410 of the external environment from the camera (for example, the camera 120 of FIG. 2) or from an external source. The display apparatus may identify one or more of users 411, 412, and 413 in the captured image 410 through various analysis of the captured image 410. Various methods of identifying users 411, 412, and 413 within a captured image 410 may be used, and therefore, may not be limited to any one method. For example, the display apparatus may use a method of classifying an object in a foreground from a background through analysis of a pixel value of the captured image 410 and detecting an edge, identifying an object representing a person through analysis of a shape of the object, and the like. In the present embodiment, three users 411, 412, and 413 from among the first user 411, the second user 412, and the third user 413 are identified within the captured image 410.

The display apparatus analyzes profiles of the first, second, and third users 411, 412, and 413 identified in the captured image 410. Various methods of analyzing profiles of the first, second, and third users 411, 412, and 413 may be applied, and the method is not limited to any one method. In the present embodiment, as an example, demographic inference is used. The demographic inference is a method of identifying a profile of a specific image using a demographic model 420 built in advance. When an object to be identified is a person, the demographic model 420 is provided to identify the profiles of the identified users 411, 412, and 413, such as gender, age, and the like. In this process, artificial intelligence (AI) may be used.

That is, the display apparatus may use an artificial intelligence model based on the demographic model 420 as the method for inferring or predicting profiles of users 411, 412, and 413 identified in a captured image 410. The display apparatus may perform a preprocessing process on data of the captured image 410 for input to the demographic model 420 and convert the preprocessed data into a form suitable for use as the input of the artificial intelligence model. The artificial intelligence model may be created through learning. Here, making the predefined operation rule or the artificial intelligence through the learning means the predefined operation rule or the artificial intelligence model set to perform the desired characteristics (or purpose) by allowing a basic artificial intelligence model to use and learn a plurality of learning data by a learning algorithm.

The artificial intelligence model may be constituted by a plurality of neural networks (or layers). The nodes of the plurality of neural networks have weights, and the plurality of neural networks may be connected to each other so that an output value of one neural network is used as an input value of another neural network. As a result, a neural network operation is performed based on an operation result of a previous layer and an operation between a plurality of weights. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

Inference prediction is a technology that logically reasons and predicts information by determining information, and includes knowledge-based (or probability-based) reasoning, optimization prediction, preference-based planning, recommendation, and the like According to the analysis method, the display apparatus may acquire the profiles for each of the first, second, and third users 411, 412, and 413. For example, the display apparatus acquires a profile 10, F of the first user 411, a profile 20, M of the second user 412, and a profile 20, F of the third user 413 through the demographic inference, respectively. In each profile, a number represents an age, F represents a female, and M represents a male.

In the present embodiment, it has been described that the artificial intelligence model is used in the demographic inference process, but the application of the artificial intelligence model is not limited thereto, depending on the design method. For example, the artificial intelligence model may be applied to the operation of calculating the separation distance of the user and the radian of the user's face, which will be described later. In this case, a calculation part of each parameter such as the demographic inference, the separation distance calculation, and the radian calculation may be provided to correspond to one neural network.

However, it may be considered that some or all of the users 411, 412, and 413 identified in the captured image 410 are not interested in the display apparatus. Even if there are a plurality of users 411, 412, and 413 in the environment where the display apparatus is installed, there may be users 411, 412, and 413 who are interested in the display apparatus (for example, watching the display apparatus), whereas there may be users 411, 412, and 413 who are not interested in the display apparatus (for example, not watching the display apparatus). When the display apparatus provides content tailored to the users 411, 412, and 413, it is effective to target the users 411, 412, and 413 who are interested in the display apparatus, and it is not effective to target the users 411, 412, and 413 who are not interested in the display apparatus.

Accordingly, the display apparatus selects users from among the users 411, 412, and 413 having a high degree of interest in the display apparatus, that is, a relatively high degree of viewing interest among the users 411, 412, and 413 identified in the captured image 410, and provides video content suitable for the selected users 411, 412, and 413. As a result, the display apparatus may provide more optimized content to the users 411, 412, and 413.

When using the artificial intelligence, the demographic model 420 may be updated through learning. Determining the model for the face or shape of the user varies according to the radian and separation distance of the face. Therefore, in the process of monitoring through the camera, the display apparatus may use the captured image when the radian of the user's face is the minimum (or the radian is within a preset angle range) and the separation distance of the user is within the preset distance range to update the demographic inference and the demographic model 420.

In the case where the display apparatus is implemented by a TV instead of the digital signage in the environment in which a user moves, the separation distance of the user is usually kept almost unchanged. In this case, the image captured at the time when the radian of the user's face is maintained within the preset angle range for a predetermined time or longer may be used to update the demographic inference and the demographic model 420.

On the other hand, the degree of viewing interest of the users 411, 412, and 413 in the present embodiment is determined in consideration of two parameters of the separation distance of the users 411, 412, and 413 and the radian of the faces of the users 411, 412, and 413. Hereinafter, each parameter will be described.

Figure 5:
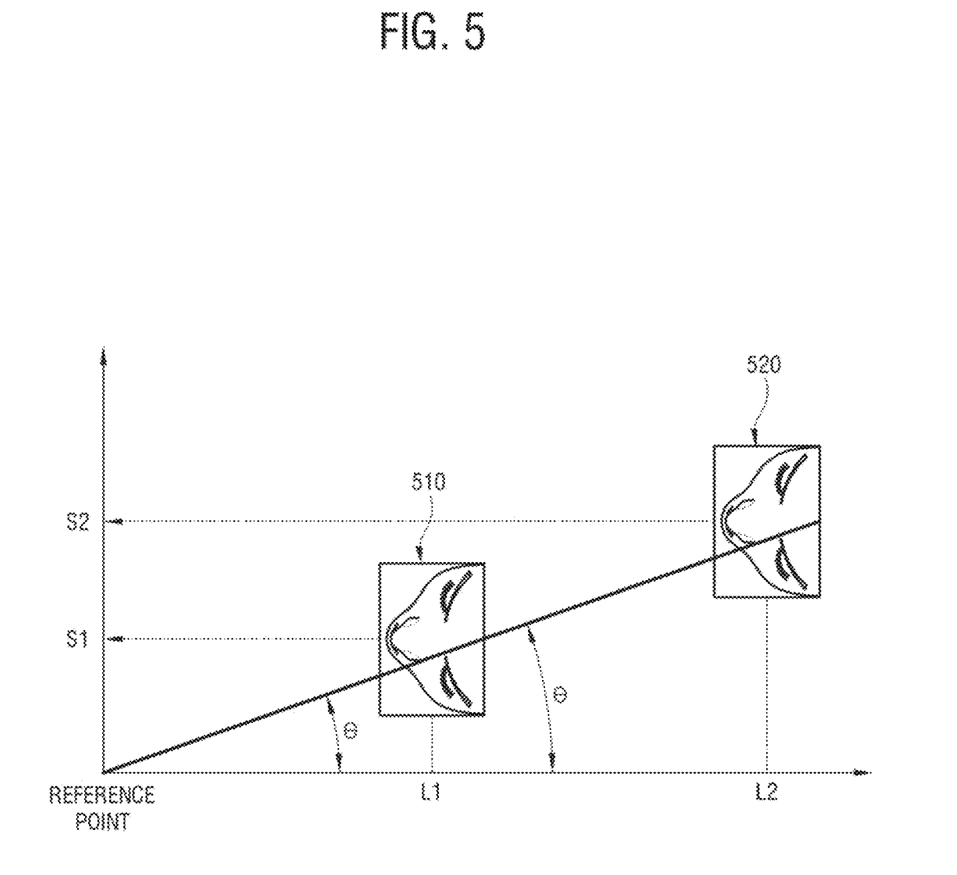
FIG. 5 is an exemplary diagram illustrating a case where a user is located at two positions having different separation distances with respect to a reference point.

FIG. 5 is an example diagram illustrating a case where a user is located at two positions having different separation distances with respect to a reference point.

As illustrated in FIG. 5, a case where a first user 510 and a second user 520 are at different positions from a predetermined reference point is considered. A first position where the first user 510 is located is separated from the reference point by a distance L1. A second position where the second user 520 is located is separated from the reference point by a distance L2. The relationship between L1 and L2 satisfies L1<L2. In addition, an angle at the first position with respect to the reference point represents θ, which is the same value as an angle at a second position with respect to the reference point.

Assuming that the first user 510 and the second user 520 are respectively looking toward the front, a line of sight of the first user 510 faces a position S1, and a line of sight of the second user 520 faces a position S2. In this case, a distance from the reference point to the position S1 is smaller than a distance from the reference point to the position S2.

The degree of viewing interest of the first and second users 510 and 520 is calculated from two parameters, the separation distance of the first and second users 510 and 520 and the radian of the faces of the first and second users 510 and 520. In the case of this drawing, since the first user 510 and the second user 520 each face the same direction, it may be considered that the radian of the face of the first user 510 and the radian of the face of the second user 520 represents the same value of θ. That is, the radians of the faces of the first and second users 510 and 520 represent the degree that the direction (or the direction in which the lines of sight of the users 510 and 520 face) in which the fronts of the faces of the first and second users 510 and 520 face deviates from the straight line passing through the reference point and the positions of the first and second users 510 and 520.

In terms of the degree of viewing interest, it is predicted that the second user 520, which is relatively far from the reference point has a relatively lower interest in the situation occurring at the reference point than the first user 510, which is relatively close to the reference point. When the display apparatus (e.g., the display apparatus 100 of FIG. 2) is at the reference point, the display apparatus has a high probability of being within the field of view of the first user 510, but has a low probability of being within the field of view of the second user 520. In addition, since the second user 520 is relatively far from the display apparatus, the probability of accurately recognizing the display apparatus is relatively low.

On the other hand, even if the first user 510 is at a closer separation distance than the second user 520, if the radians of the faces of first and second users 510 and 520 are different from each other, the degree of viewing interest is also different. For example, the case where the first user 510 is at a first position with a separation distance L1 and a second user is at a second position with a separation distance L2, the condition of L1<L2 is maintained as it is, and the radians of the faces of the first and second users 510 and 520 are different from each is considered. In this state, when the radian of the face of the second user 520 is relatively smaller than the radian of the face of the first user 510, even if the second user 520 has a separation distance greater than the first user 510, the degree of viewing interest of the second user 520 may be higher.

In this regard, the degrees of viewing interest of the users 510 and 520 may be calculated by taking into account two parameters of the separation distances of the users 510 and 520 and the radians of the faces of the users 510 and 520.

Hereinafter, an example of obtaining the separation distance will be described.

Figure 6:
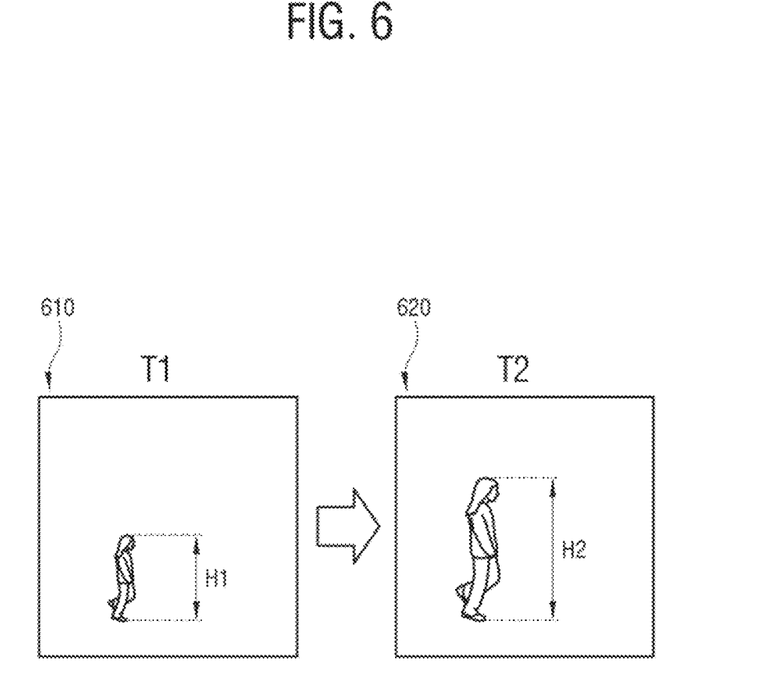
FIG. 6 is an example diagram illustrating a method of inferring separation distances from captured videos acquired for each time period.

FIG. 6 is an example diagram illustrating a method of inferring separation distances from captured images acquired for each time period.

As illustrated in FIG. 6, a display apparatus (e.g., the display apparatus 100 of FIG. 2) may acquire first and second captured images 610 and 620 continuously captured every unit time from a camera (e.g., the camera 120 of FIG. 2). When the camera is not a monocular type, it is possible to easily calculate the separation distance of the user from the reference point by using a mathematical operation such as a trigonometric function. On the other hand, when the camera is the monocular type, the display apparatus estimates the separation distance of the user from the reference point by estimating the depths of the first and second captured images 610 and 620 continuously captured in chronological order.

For example, it is exemplified in FIG. 6 that there is an object which is a user identified as the same person in the first captured image 610 captured at a time point T1 and the second captured image 620 captured at a time point T2 after the time point T1. If the user is moving, a scale H1 of an object representing the user within the first captured image 610 will be different from a scale H2 of an object representing the user within the second captured image 620. Here, the scale of the object indicates a height, but may include parameters such as a width and a volume.

As illustrated in FIG. 6, when H1<H2, it is indicated that the user moves closer to the reference point. On the other hand, if H1>H2, it is indicated that the user moves away from the reference point. When H1 and H2 are substantially the same, it is indicated that the user is not moving.

The display apparatus may calculate the separation distance of the user at a specific time point (for example, time point T2) based on a time difference between the time points T1 and T2 and the change in the scale between H1 and H2. Even in this case, the artificial intelligence may be used. That is, the display apparatus may monitor the change in the user's scale for a predetermined time through images captured by the camera, and calculate the separation distance at a specified time point. Since various methods may be applied to the depth-based estimation using the time difference and the scale change, a detailed description thereof will be omitted.

Alternatively, the display apparatus may calculate a relative separation distance of each user based on a difference in scale for each user when the plurality of users are identified in one of the captured images 610 and 620. For example, when it is assumed that a plurality of users have relatively similar sizes, it can be estimated that users with a large scale have a relatively close separation distance, and users with a small scale have a relatively distant separation distance.

In this way, the display apparatus may acquire the separation distance of the user according to various methods.

Hereinafter, the radian of the face will be described.

Figure 7:
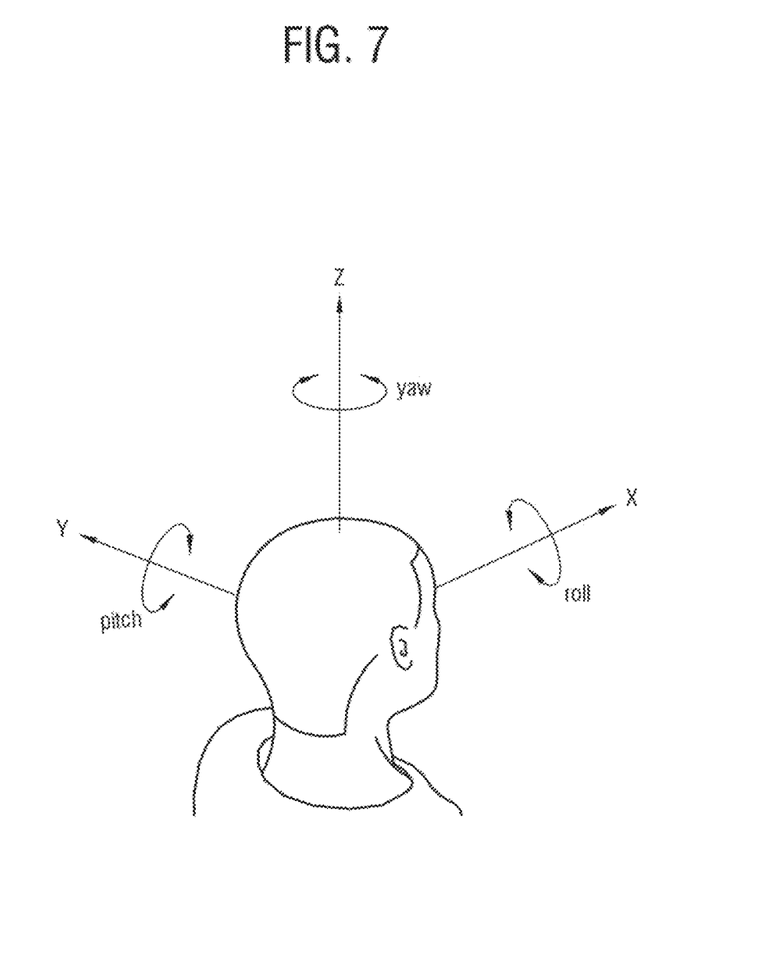
FIG. 7 is an example diagram illustrating a parameter related to a radian of a user's face.

FIG. 7 is an example diagram illustrating a parameter related to a radian of a face of a user.

As illustrated in FIG. 7, a case where a user is looking at the reference point in front of the user is considered. The line of sight that the user looks at the reference point follows an X-axis line. If the user nods his/her head up and down, the user's face will rotate around a Y-axis line perpendicular to the X-axis line. If the user turns his/her head horizontally, the user's face rotates around a Z-axis line perpendicular to the X-axis line and the Y-axis line.

When the position of the user's face centered on the X-axis line as illustrated in FIG. 7 is called a correct position, a rotation angle relative to the correct position centered on the X-axis line is a roll angle, a rotation angle relative to a fixed position centered on the Y-axis line is pitch angle, and a rotation angle relative to the correct position centered the Z-axis line is called a yaw angle. Here, since the two parameters related to the line of sight to the reference point are the pitch and yaw, two values of the pitch and yaw are used as the radian of the face considered for determining the degree of viewing interest of the user.

For a user, the fact that the viewing interest for the reference point is high means that the radian of the face relative to the reference point is small. That is, the smaller the two values of pitch and yaw measured for the user, the higher the degree of viewing interest. Further, as at least one of the two values of the pitch and yaw increases, the degree of viewing interest of the corresponding user decreases.

Hereinafter, an example in which the display apparatus selects a user according to a degree of viewing interest among a plurality of users will be described.

Figure 8:
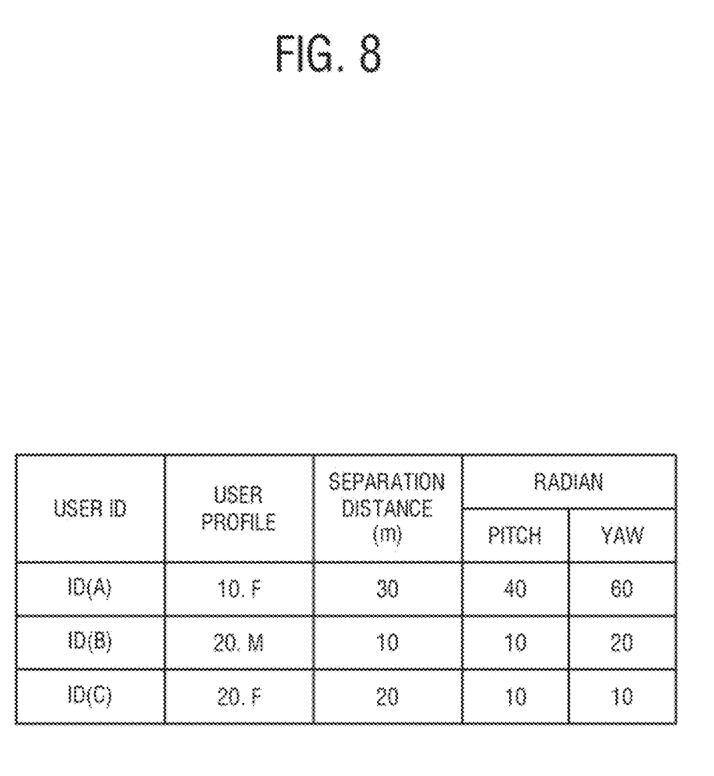
FIG. 8 is an example view illustrating a result of acquiring, by the display apparatus, profiles of a plurality of users, and separation distances and radians of faces of each user.

FIG. 8 is an example view illustrating a result of acquiring, by the display apparatus, profiles of a plurality of users, and separation distances and radians of faces of each user.

As illustrated in FIG. 8, the display apparatus (e.g., the display apparatus 100 of FIG. 2) may obtain a profile of each identified user, a separation distance of each user, and a radian of each user's face through analysis as described above. FIG. 8 is an example of a table representing the analysis results for each of three users whose user identifiers (IDs) are ID(A), ID(B), and ID(C). In this table, the separation distance is shown in units of meters (m) and the radian is shown in units of radians (rad), but the specific units may vary depending on the measurement method.

When acquiring the analysis result as described above, the display apparatus selects at least some of the plurality of users based on the separation distances and the radians for each user. A screening method may include a method of using a threshold value and/or a method of using a ranking. The radian may be determined based on the pitch value and/or the yaw value, or may be determined as a sum of the pitch value and the yaw value. In this way, the method of calculating the radian from the pitch value and the yaw value is not limited. In the case of summing the pitch value and the yaw value, weights may be assigned depending on the design method, which will be described later.

As an example of using the threshold, the case where the threshold conditions with a separation distance of 25 m or less and a (pitch+yaw) of 25 rad or less of the radian are set is considered. The user IDs with the separation distance of 25 m or less are ID(B) and ID(C). The ID(C) is the only user ID whose (pitch+yaw) is 25 rad or less. Therefore, in this table, the user who satisfies both threshold conditions is ID(C). According to the analysis result, the display apparatus displays a profile of the user with ID(C), that is, displays a video of content corresponding to a profile corresponding to a female in her twenties.

As an example of using the ranking, consider a case of setting the condition of the top two or more users in comparison ranking based on the separation distance and the radian among all the users is considered. In this case, equations for calculating the degree of viewing interest for each user based on the separation distance and the radian are designated to enable mutual comparison. These equations may reflect various functions or algorithms. In the present embodiment, for simplicity, clarity, and convenience, the separation distance, the pitch value, and the yaw value are all summed to calculate the degree of viewing interest. As a result, the degree of viewing interest of the user with ID(A) is calculated as 130, the degree of viewing interest of the user with ID(B) is calculated as 40, and the degree of viewing interest of the user with ID(C) is calculated as 40. According to the analysis result, the display apparatus displays the video of content corresponding to the user's profile (male in 20s) with ID (B) and the user's profile (female in 20s) with ID(C).

In calculating the degree of viewing interest, different weights may be assigned to the separation distance, the pitch value, and the yaw value, respectively, according to conditions. Hereinafter, the embodiment will be described.

Figure 9:
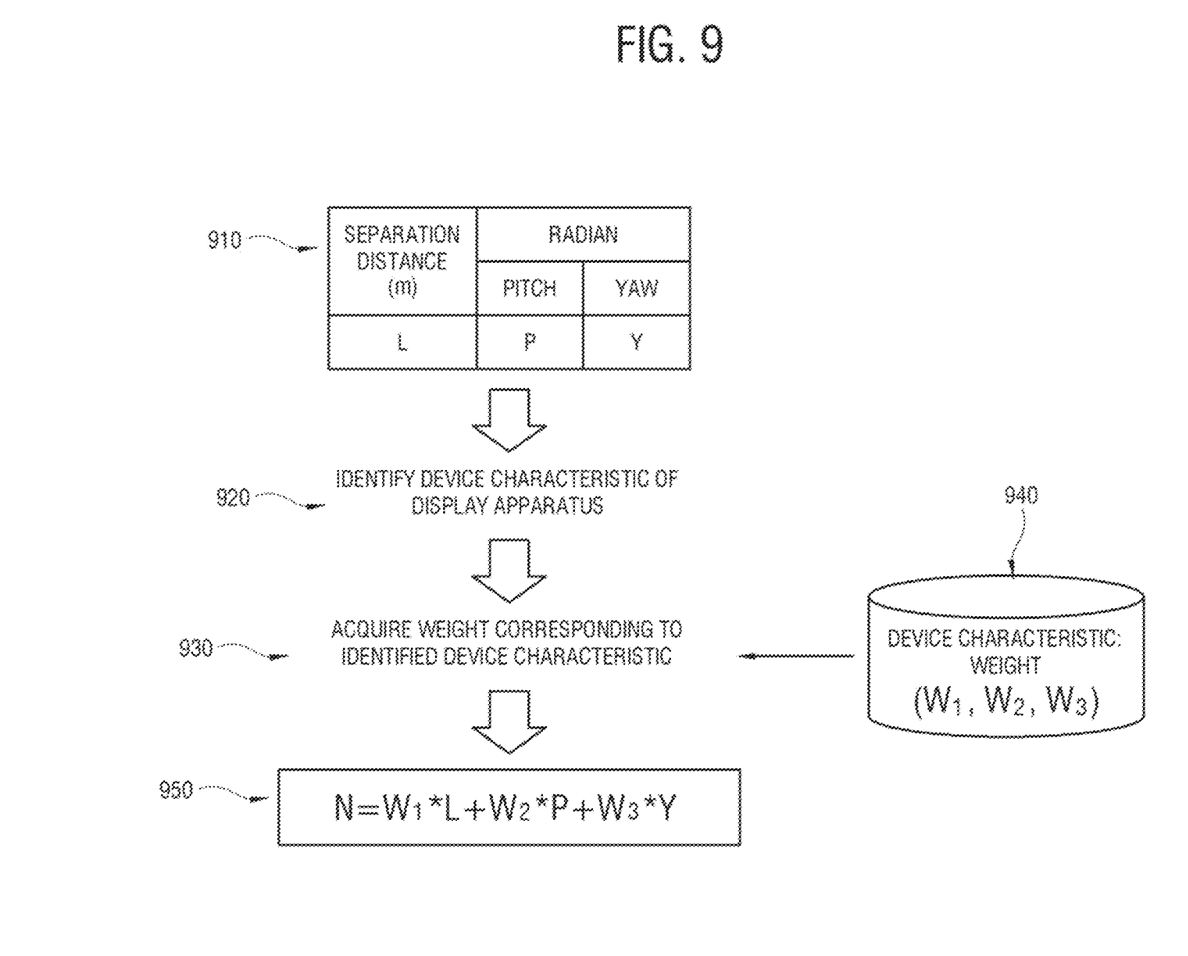
FIG. 9 is an example diagram illustrating a method of deriving a degree of viewing interest by assigning weights to each item identified for a user.

FIG. 9 is an example diagram illustrating a method of deriving a degree of viewing interest by assigning weights to each item identified for a user.

As illustrated in FIG. 9, the display apparatus (e.g., the display apparatus 100 of FIG. 2) may acquire the user's profile of a predetermined user, the separation distance of the user, the pitch value and the yaw value related to the radian of the user's face (910). Depending on the design method, the display apparatus may calculate the digitized degree of viewing interest from the identified separation distance, pitch value and yaw value. For example, suppose that a separation distance L, a pitch value P, and a yaw value Y are acquired in relation to a user. From these values, the degree of viewing interest N of the user is calculated.

As the simplest example for calculating N, the case of simply summing L, P, and Y is considered. In this case, N=L+P+Y. Here, since the separation distance is different in units from the pitch value and the yaw value, an additional mathematical correction may be reflected for at least one of L, P, and Y to enable calculation.

However, due to various conditions (specific conditions will be described later) related to the display apparatus, it may be less accurate to calculate N by reflecting L, P, and Y as having the same weight. From this point of view, the display apparatus assigns weights to at least one of L, P, and Y, and the weights may be adjusted and reflected according to conditions.

For example, the display apparatus identifies the device characteristics of the display apparatus (920). Here, the device characteristics may include various hardware or software related characteristics related to the display apparatus, and may include various factors such as the aspect ratio of the display, the maximum luminance of the display apparatus, and the installation area of the display apparatus.

The display apparatus acquires a weight corresponding to the identified device characteristic (930). The display apparatus may acquire a weight for each parameter through, for example, searching a database or a list in which a weight relative to the device characteristic is previously designated (940). In the present embodiment, the weight $W_1$ for the separation distance, the weight $W_2$ for the pitch value, and the weight $W_3$ for the yaw value are designated, but the weight may be designated for only one or some parameters, rather than all parameters.

The display apparatus calculates the degree of viewing interest by reflecting the acquired weight (950). For example, the degree N of viewing interest may satisfy $N=W_1*L+W_2*P+W_3*Y$, and "*" may be a multiplication operation or other mathematical operation. This equation is only one of various possible equations that can be used to calculate the degree of viewing interest, and the equation for the degree of viewing interest is not limited to this example.

Hereinafter, an example of a scenario in which the above-described embodiment is applied will be described.

Among the device characteristics of the display apparatus, there is the aspect ratio of the display that displays a video. Typically, the display has a shape in which one of a horizontal length and a vertical length is relatively longer than the other. For convenience, a state in which the horizontal length of the display is longer than the vertical length of the display is referred to as a landscape mode, and a state in which the vertical length of the display is longer than the horizontal length of the display is referred to as a portrait mode.

Considering the probability that the user recognizes the display of the display apparatus, this probability is different between the case where the display apparatus is in the landscape mode and the case in the portrait mode. When the display apparatus is in the landscape mode, since the horizontal length of the display is relatively long, a relatively large weight may be assigned to the yaw angle. On the other hand, when the display apparatus is in the portrait mode, since the vertical length of the display is relatively long, in this case, a relatively large weight may be assigned to the pitch angle. From this point of view, the display apparatus adjusts the weight for the yaw angle to be to be greater than the weight for the pitch angle when it is identified that the display apparatus is in the landscape mode, and adjusts the weight for the pitch angle to be higher than the weight for the yaw angle when it is identified that the display apparatus is in the portrait mode. As a result, the degree of viewing interest of the user can be more accurately identified. However, this is only an example of the method of applying various weights.

The operations of the apparatus as described in the above embodiments may be performed by an artificial intelligence system provided in the apparatus. The artificial intelligence may be applied to various systems using machine learning algorithms. The artificial intelligence system is a computer system that implements intelligence corresponding to a human level or comparable to a human level, and is a system in which a machine, an apparatus, or a system autonomously performs learning and determination, and the recognition rate and determination accuracy are improved based on accumulation of use experience. The artificial intelligence technology includes machine learning technologies that use algorithms to classify/learn characteristics of input data, element technologies that simulate functions of recognition, determination, and the like of a human brain using machine learning algorithms, and the like.

Examples of the element technologies include at least one of, for example, linguistic understanding technology for recognizing human language and character, visual understanding technology for recognizing objects like human vision, reasoning and prediction technology for logically reasoning and predicting information by determining the information, knowledge expression technology for processing human experience information with knowledge data, or motion control technology for controlling autonomous driving of vehicles and movement of robots.

Here, the linguistic understanding is a technology of recognizing and applying, and processing human languages/characters, and includes natural language processing, machine translation, a dialog system, question and answer, speech recognition/synthesis, and the like.

The inference/prediction is a technology of deciding and logically inferring and predicting information, and includes knowledge and probability-based inference, optimization prediction, preference-based planning, recommendation, and the like.

The knowledge representation is a technology of automating and processing human experience information as knowledge data, and includes knowledge establishment (data generation/classification), knowledge management (data utilization), and the like.

Methods according to embodiments of the disclosure may be implemented in a form of program commands that may be executed through various computer means and may be recorded in a non-transitory computer-readable recording medium. The computer-readable recording medium may store a program command, a data file, a data structure, or the like, alone or a combination thereof. For example, the computer-readable recording medium may include a non-volatile storage such as a USB memory device, memories such as a RAM, a ROM, a flash memory, a memory chip, and an integrated circuit, or storage media, such as a CD, a DVD, a magnetic disk, and a magnetic tape, that may be optically or magnetically written and at the same time, read by a machine (for example, a computer), regardless of whether data are erasable or rewritable. It may be appropriated that a memory that may be included in a mobile terminal is an example of a storage medium appropriate for storing a program or programs including instructions implementing the embodiments of the disclosure and readable by a machine. The program instructions recorded in this storage medium may be specially designed and constructed for the disclosure or may be known and usable by those skilled in the art of computer software. Alternatively, the computer program instruction may also be implemented by the computer program product.

While various embodiments have been described, it will be understood by one of ordinary skill in the art that various changes in form and details may be made therein without departing from the spirit and scope of the disclosure as defined by the following claims.

What is claimed is:

1. A display apparatus comprising:
a display; and
a processor configured to:
identify a plurality of users from an image of an external environment of the display apparatus captured by a camera,
select at least one user, among the plurality of identified users, based on a separation distance of the user and a radian of a face of each of the plurality of identified users, wherein the separation distance of the user is a distance between a position of the user and the display, and
display content corresponding to the selected at least one user on the display.

2. The display apparatus of claim 1, wherein the processor is further configured to identify a degree of viewing interest of the user based on the separation distance and the radian, and display the content on the display based on the degree of viewing interest.

3. The display apparatus of claim 2, wherein the processor is further configured to select, based on the degree of viewing interest, the user from among a plurality of users identified in the image, and select the content based on a profile of the selected user.

4. The display apparatus of claim 3, wherein the processor is further configured to compare degrees of viewing interest of the plurality of users and select at least one user with a predetermined ranking or higher from among the plurality of users.

5. The display apparatus of claim 3, wherein the processor is further configured to select the user based on the user having a degree of viewing interest that is greater than or equal to a threshold value.

6. The display apparatus of claim 3, wherein the processor is further configured to obtain the profile of the user by using a demographic model.

7. The display apparatus of claim 2, wherein the processor is further configured to apply weights corresponding to a device characteristic of the display apparatus to the separation distance and the radian, and determine the degree of viewing interest based on the separation distance and the radian to which the weights have been applied.

8. The display apparatus of claim 7, wherein the processor is further configured to:
identify the radian based on a pitch value and a yaw value of the face of the user,
identify an aspect ratio of the display, and
apply weights to the pitch value and the yaw value based on the aspect ratio of the display,
wherein the weight applied to the yaw value is increased based on identifying that a horizontal length of the display is greater than a vertical length of the display, and
wherein the weight applied to the pitch value is increased based on identifying that the vertical length of the display is greater than the horizontal length of the display.

9. The display apparatus of claim 1, wherein the processor is further configured to identify the radian based on a pitch value of the face of the user and a yaw value of the face of the user.

10. The display apparatus of claim 1, wherein the processor is further configured to select content corresponding to a profile of the user, and display the selected content on the display.

11. The display apparatus of claim 1, wherein the processor is further configured to select a layout of content corresponding to a profile of the user, and display the content according to the selected layout on the display.

12. A method of controlling a display apparatus, the method comprising:
identifying a plurality of users from an image of an external environment of the display apparatus captured by a camera;
selecting at least one user, among the plurality of identified users, based on a separation distance of the user and a radian of a face of each of the plurality of identified users, wherein the separation distance of the user is a distance between a position of the user and the display; and
displaying content corresponding to the selected at least one user on a display of the display.

13. The method of claim 12, further comprising identifying a degree of viewing interest of the user is identified based on the separation distance and the radian;

wherein the displaying the content comprises displaying the content based on the degree of viewing interest.

14. The method of claim 13, further comprising:
selecting, based on the degree of viewing interest, the user from among a plurality of users identified in the image; and
selecting the content based on a profile of the selected user.

15. The method of claim 14, wherein the selecting the user comprises:
comparing degrees of viewing interest of the plurality of users; and
selecting at least one user with a predetermined ranking or higher from among the plurality of users.

16. The method of claim 14, wherein the selecting the user comprises selecting the user based on the user having a degree of viewing interest that is greater than or equal to a threshold value.

17. The method of claim 14, further comprising obtaining the profile of the user using a demographic model.

18. The method of claim 13, wherein the identifying the degree of viewing interest comprises:
applying weights corresponding to a device characteristic of the display apparatus to the separation distance and the radian; and
determining the degree of viewing interest based on the separation distance and the radian to which the weights have been applied.

19. The method of claim 18, wherein the radian is identified based on a pitch value and a yaw value of the face of the user,
wherein the applying the weight to the radian comprises:
identifying an aspect ratio of the display; and
applying weights to the pitch value and the yaw value based on the aspect ratio of the display,
wherein the weight applied to the yaw value is increased based on identifying that a horizontal length of the display is greater than a vertical length of the display, and
wherein the weight applied to the pitch value is increased based on identifying that the vertical length of the display is greater than the horizontal length of the display.

20. The method of claim 12, wherein the identifying the radian comprises identifying the radian based on a pitch value of the face of the user and a yaw value of the face of the user.

* * * * *